P. L.
BEVEL GEAR MILLING MACHINE.
APPLICATION FILED DEC. 5, 1905.

935,077.

Patented Sept.

3 SHEETS—SHEET 1.

Witnesses.
H. L. Trimble
L. F. Brock

Inventor
Percy Leonard
by Chas H
his attorney

P. L. WESTON.
BEVEL GEAR MILLING MACHINE.
APPLICATION FILED DEC. 5, 1905.
935,077.
Patented Sept. 28, 1909.
3 SHEETS—SHEET 2.
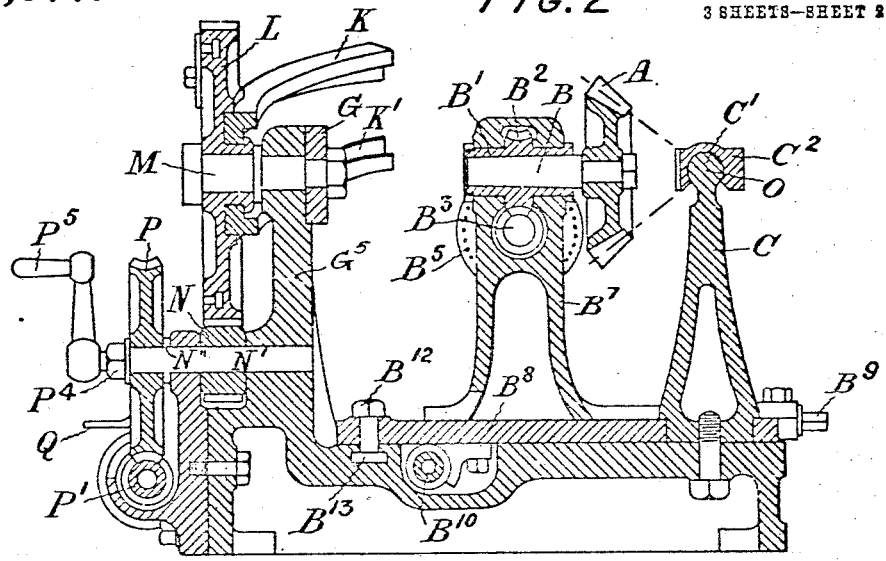
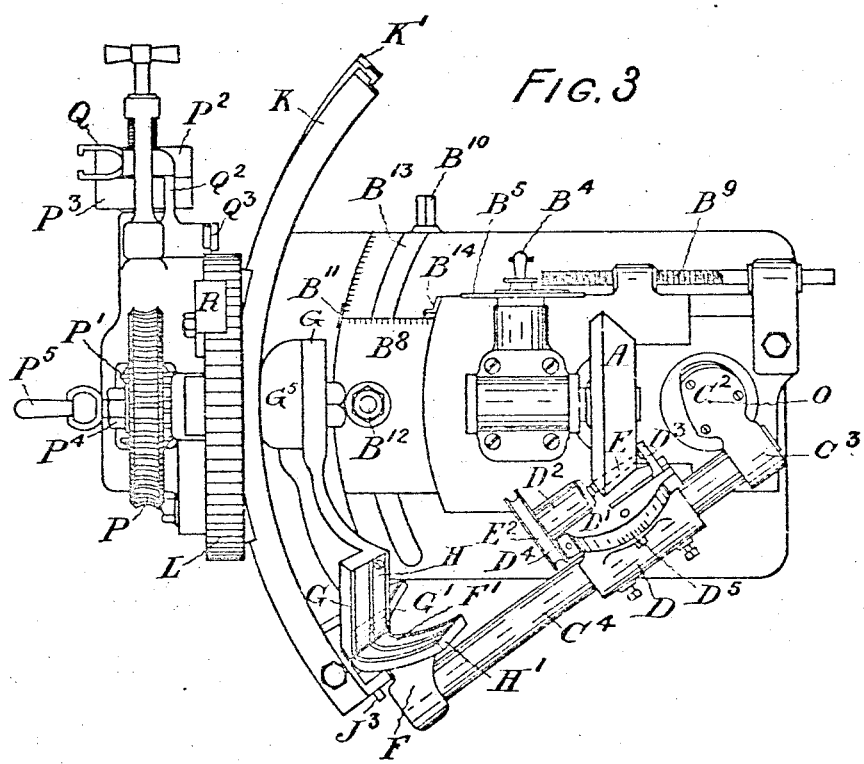
Witnesses.  Inventor.

P. L. WESTON.
BEVEL GEAR MILLING MACHINE.
APPLICATION FILED DEC. 5, 1905.

935,077.

Patented Sept. 28, 1909.
3 SHEETS—SHEET 3.

Witnesses.
Inventor.

UNITED STATES PATENT OFFICE.

PERCY LEONARD WESTON, OF ANNANDALE, SYDNEY, NEW SOUTH WALES, AUSTRALIA.

BEVEL-GEAR-MILLING MACHINE.

935,077.

Specification of Letters Patent.   Patented Sept. 28, 1909.

Application filed December 5, 1905.   Serial No. 290,467.

*To all whom it may concern:*

Be it known that I, PERCY LEONARD WESTON, a subject of the King of Great Britain and Ireland, residing at Annandale, Sydney, in the State of New South Wales, in the Commonwealth of Australia, electrical engineer, have invented certain new and useful Improvements in Bevel-Gear-Milling Machines; and I do hereby declare that the following is a full, clear, and exact description of the invention, which will enable others skilled in the art to which it appertains to use the same.

This invention refers to improvements in machines for accurately cutting the teeth of bevel gears.

The object of the invention is to provide a machine by means of which either straight or helical teeth can be cut on bevel gearing with an elongated rotary tool or cutter whose axis of revolution is in the direction of the tooth grooves, so that (first) the correct cone variation in the size of the teeth is secured and (second) accurate involute profiles are produced by a generating motion without the use of a templet or former.

The essential features of the invention are:—the use of an elongated rotary tool or cutter and means for so guiding it with its axis in the direction of the intertooth grooves that it describes an involute path. This guiding motion is geometrically that of a plane disk rolling on a fixed cone the latter of which bears a definite relation to the pitch cone of the bevel gear to be cut. The practical method of carrying this out is herein described as follows:—

Figure 1:
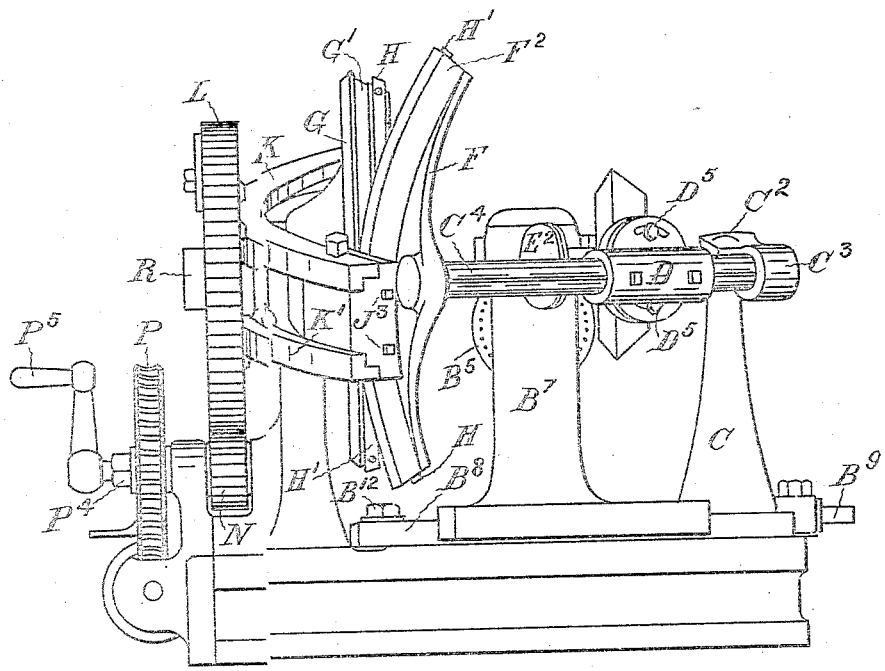
Figure 6:
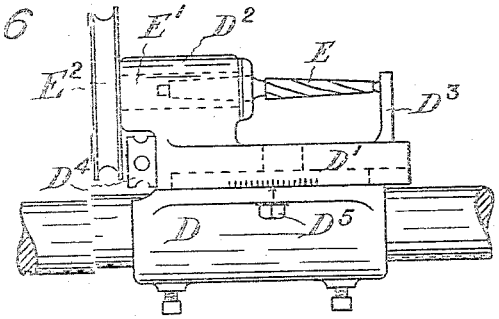
Figure 7:
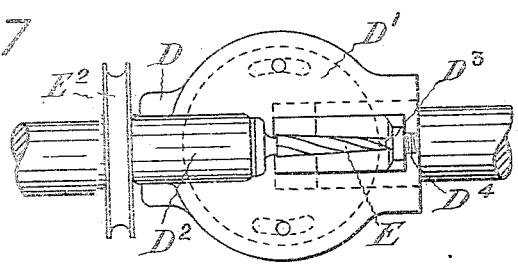
Figure 4:
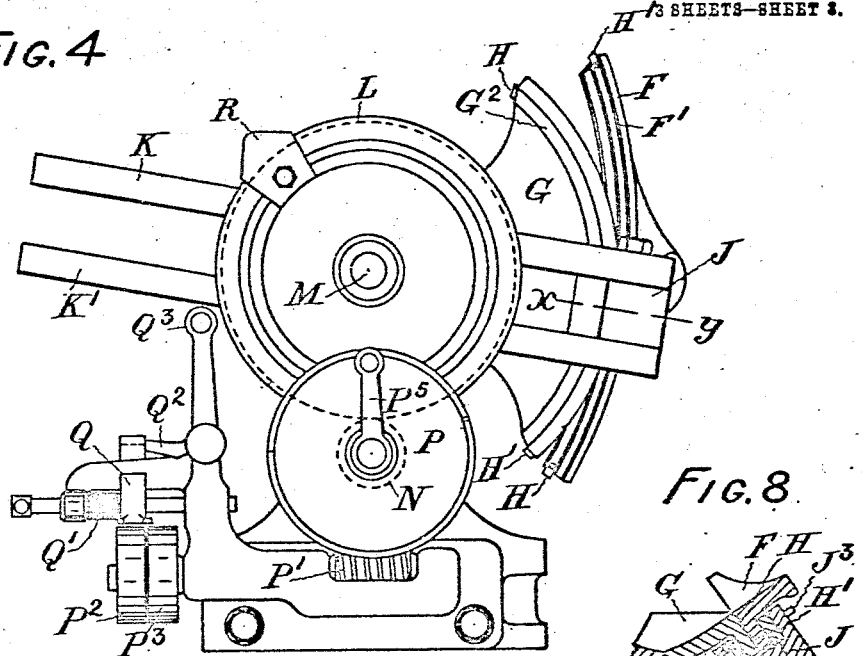
Figure 8:
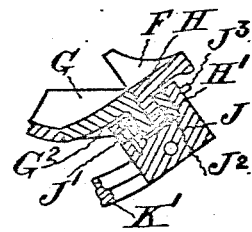
Figure 5:
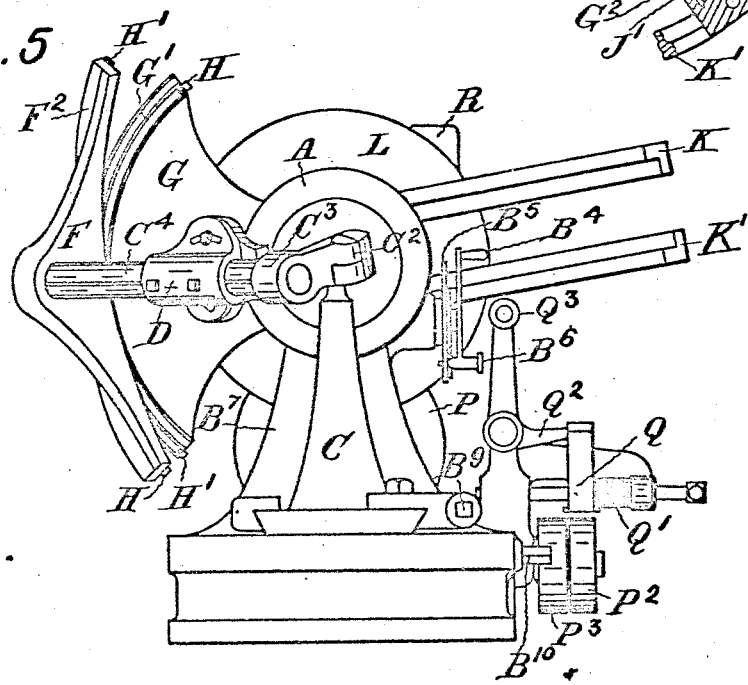

In the drawings:—Figure 1 is a side elevation of the machine. Fig. 2 is a longitudinal vertical section. Fig. 3 is a plan. Figs. 4 and 5 are opposite end views. Figs. 6 and 7 are enlarged views of the cutter and mountings. Fig. 8 is a section through line $x-y$, Fig. 4.

A is the bevel blank on which the teeth are to be cut. This blank is mounted on a taper arbor B which fits into a hollow spindle $B^1$ carrying a worm wheel $B^2$ which engages a worm $B^3$ which in turn is operated by a handle $B^4$. The revolution of the worm $B^3$ is controlled by a division plate $B^5$ and stop $B^6$.

$B^7$ is a movable standard, whose position on the plate $B^8$ is adjusted by means of the screw $B^9$. The plate $B^8$ is adapted to be partially revolved about the axis of the standard C by means of the worm gear $B^{10}$, its position being indicated by the pointer $B^{11}$ traveling over a graduated scale as shown.

$B^{12}$ is clamping bolt to retain the plate $B^8$ in position. The head of this bolt travels in the curved groove $B^{13}$.

C is a fixed standard on the top of which is a ball $C^1$ whose center O is in line with the axis of the arbor B and is hereinafter referred to as the fixed apex.

$C^2$ is a spherical socket which articulates with the ball $C^1$ and forms a ball and socket joint as shown.

$C^3$ is an extension on the socket $C^2$ provided for the purpose of supporting an arm $C^4$ which is rigidly attached thereto. This arm carries a movable head D and swivel plate $D^1$ the latter bearing the cutter spindle head $D^2$ and movable tail stock $D^3$ which is adjusted by the capstanheaded screw $D^4$.

E is cutting tool which is shown in drawings as a spirally fluted milling cutter. This form of cutter is used for general milling purposes but for grinding or finishing work a plain abrasive tool may be used, the essential form of the cutter being that the contour of the tool should be a frustum of a cone, the apex of which would in producing the ordinary straight form of teeth be the point O as shown in the drawings, but for the production of helical teeth when the axis of the cutter is out of line with the fixed apex O the apex of the cutter will be determined by describing a circle about the fixed apex O to touch the cutter axis produced. The point of contact will be the apex of the cutter. The cutter E is provided with a taper shank which fits into the spindle $E^1$ which is revolved by the grooved pulley $E^2$. The other end of the cutter is free to revolve on a hardened center on the tail stock $D^3$. In the drawings the position of the cutter is shown forming an ordinary straight tooth. The adjustment of the cutter axis to form helical teeth is performed by means of the swivel plate $D^1$, which is adapted to be clamped in any position by means of the set screws $D^5$. A graduated scale as shown in Fig. 6 is provided to facilitate the adjustment of the swivel plate $D^1$. On the free end of the arm $C^4$ is fixed a sector plate F. The working face $F^1$ of this plate is a portion of the plane containing the cutter axis and the fixed apex O, and is parallel to the plane of the swivel plate $D^1$ which carries the cutter. In other words the working face of the plate may be described as an annular portion of a sector of a disk whose center is the fixed apex O and in the plane of which lies the cutter axis. The plate F is fixed to the arm C⁴ by a web as shown. The working face F¹ engages a guide cone G fixed to a supporting standard G⁵, the engaging face G¹ of which is in the form of a portion of a frustum of a cone whose apex is at the point O. The relation of the angle of the face of this guide cone to the angle of the pitch cone of the work is determined by the following formula:—

$$\sin(a) = \sin(b) \times \cos(c)$$

where $(a)$ is the semi-angle of the guide cone. $(b)$ is the semi-angle of the pitch cone of the work. $(c)$ is the angle at which the pitch cone of the work is intersected by the involute profile of the tooth of the work. That is to say that the value of $(c)$ determines the obliquity of action of the teeth on the work.

A guide cone of particular angle can without serious error be used for work within a certain range on either side of the corresponding correct pitch angle of the work. Assuming that the ordinary range of semi-pitch angles of the work is from 15 degrees to 75 degrees and the angle of obliquity 15 degrees it is found that a set of six guide cones would be sufficient to produce this range of work. Provision is made as shown in the drawings for readily detaching the guide cone from its supporting standard.

The faces F¹ and G¹ are provided with corresponding grooves to receive a pair of flexible steel bands H and H¹. The depth of these grooves will be about one half the thickness of the bands. The top end of the band H is secured by means of a screw to the upper extremity of the guide cone G while the lower extremity is similarly secured to the lower extremity of the sector plate F. The top end of the band H¹ is attached to the top end of the sector plate F while its lower end is attached to the lower end of the guide cone G.

J is a traveling clutch which grips and maintains the sector plate F in contact with the guide cone G. This clutch is provided with a friction roller J¹ which bears on the inner surface G² of the cone G and a pressure plate J² which bears on the outer face F² of the sector plate F, see Fig. 8. The pressure exerted by the plate J² is regulated by set screws J³. The clutch J is attached to the ends of a pair of circularly curved arms K and K¹. The form of the arms K and K¹ is that of arcs of circles described about the apex O. These arms fit into corresponding grooves in the spur wheel L which is adapted to partially revolve about a horizontal spindle M. This partial revolution causes the clutch J to travel in a circular path, the roller J¹ running on the inner surface G² of the cone G and the plate J² sliding on the outer surface F² of the plate F which results in the sector plate F rolling on the guide cone G and thus causing the cutter E, while operating, to describe a geometrically correct involute conical surface which is the required profile of the teeth. The spur wheel L meshes with a pinion N which is driven by a worm wheel P gearing with a worm P¹ which in turn is driven by a pulley P².

P⁴ is a nut which acts as a clutch for the worm wheel P when screwed up, and when slackened allows it to run free so that by revolving the handle P⁵ the spur gear L can be rotated by the pinion N without the intermediate worm gear. The belt engaging the pulley P² is controlled by a shifting guide Q which is held in the operating position against the pressure of a coil spring Q¹ by means of a trigger Q² which is in the form of a rocking lever one arm of which retains the shifting guide Q while the other carries a roller Q³.

R is an adjustable cam secured to the spur wheel L in such a manner that when the latter is in any predetermined position the cam will engage the roller Q³ and release the trigger Q² thus allowing the guide Q to throw the belt on to a loose pulley P³.

The method of operating the machine is as follows:—The most suitable guide cone in relation to the work being attached and the bands H and H¹ secured in position, the clutch J is then placed in engagement with the sector plate F and guide cone G either at the top or bottom of its path. The work A which has preferably had the grooves previously roughly gashed out in any well known way is then mounted on the arbor B. Should the angle of the guide cone exactly correspond, according to the formula hereinbefore given, with the pitch cone of the work then the plate B⁸ which carries the work will be in the central position as shown in the drawings; but should the pitch cone of the work be of a slightly different semi-cone angle then it will be necessary to adjust the difference by moving the plate B⁸. This adjustment is facilitated by the graduated scale and pointer B¹¹. The next adjustment necessary is to bring the work so that its apex corresponds with point O; this is effected by the screw B⁹, the correct position being indicated by the graduated scale and pointer B¹⁴. A suitable cutter E is now mounted in the cutter head D and the position of the latter is adjusted relative to the work and clamped on the arm C⁴ by the set screws. The cutter is now set in motion by means of a belt from an overhead countershaft. The feed motion is then started by setting the trigger Q². The action of the worm and spur gearing of the feed mechism results in a very slow motion of the spur wheel L, and the carrying of the clutch J, from the beginning of its path at one end of the sector plate F and guide cone G, toward its central horizontal position. When the clutch J has completed its predetermined path required by the depth of the finished groove in the work, the cam R comes in contact with the roller Q³ and releases the trigger Q² thus throwing the feed mechanism out of gear. This operation completes the profile of one side of the first tooth. The cutting tool is now returned to its original position clear of the work by first slackening the lock nut P⁴ and then revolving the handle P⁵ in the reverse direction. The work is now revolved through an angle corresponding to the pitch of one tooth by means of the handle B⁴ and worm gear B² and B³, the nut P tightened, and the operation as before described repeated, and so on until all the teeth have been cut on one side. To complete the reverse profiles of the teeth the clutch J is started from the opposite end of the sector plate F and guide cone G, the cam R being adjusted to correspond.

The pinion N is fixed on a stub shaft N' having at its outer end a handle P⁵ and a collar N'' between the handle P⁵ and the pinion N. Loosely mounted on the stub shaft N' and the outer side of the collar N'' is a worm wheel P and screwed on the stub shaft N' on the outer side of the worm wheel P is the nut P⁴. By slackening the nut P⁴ on the stub shaft N', the latter can be turned in either direction without causing the revolution of the worm wheel P, and by tightening the nut P⁴ against the worm wheel P the worm wheel and shaft can be caused to revolve unitedly so that the motion transmitted from the worm P' to the worm wheel P will be communicated to the stub shaft N' and pinion N, and by the latter to the spur wheel L. During the revolution of the worm P' motion is transmitted by it to the worm wheel P, stub shaft N' and pinion N and by the pinion N to the spur wheel L to cause the operation of the co-acting parts. When the parts have performed their functions, the revolution of the worm P' is discontinued and the nut P⁴ can then be slackened to permit of the stub shaft N' being turned by the handle P⁵ in the reverse direction to restore the parts co-acting with the spur wheel L to their normal or initial position without the necessity of causing the reverse revolution of the worm P' and the motion transmitting means.

Having thus fully described my invention what I claim as new and desire to secure by Letters Patent is:

1. A bevel gear milling machine comprising a stationary standard having a head whose center constitutes a fixed axis for the co-acting parts, a sleeve having a socket articulatingly mounted on the head of the stationary standard, an arm supported by the sleeve, a tool supporting means connected with the arm, a work-supporting standard adjustable longitudinally to the stationary standard and radially on an arc concentric with the fixed center, means for actuating the arm to guide the tool with respect to the work, and means for producing the required geometrically correct surface, comprising a sector plate on the free end of the arm, and a guide cone engaging the sector plate.

2. A bevel gear milling machine comprising a tool supporting arm, means for articulatingly holding one end of the tool supporting arm, a sector plate connected with the other end of the tool supporting arm, a guide cone engaging with the working face of the sector plate, and a traveling clutch maintaining the sector plate in contact with the guide cone.

3. A bevel gear milling machine comprising a tool supporting arm, means for articulatingly holding one end of the tool supporting arm, a sector plate connected with the other end of the tool supporting arm, a guide cone engaging with the working face of the sector plate, a pair of flexible bands secured to the sector plate and to the guide cone, and a traveling clutch maintaining the sector plate in contact with the guide cone.

4. A bevel gear milling machine comprising a fixed standard, a tool supporting arm, a tool holder adjustable on the tool supporting arm, means articulatingly connecting one end of the tool supporting arm with the fixed standard, a sector plate connected with the other end of the tool supporting arm, a guide cone engaged with the working face of the sector plate and a traveling clutch maintaining the sector plate in contact with the guide cone.

5. A bevel gear milling machine comprising a fixed standard, a tool supporting arm, a tool holder adjustable on the tool supporting arm, means articulatingly connecting one end of the tool supporting arm with the fixed standard, a sector plate connected with the other end of the tool supporting arm, a guide cone engaged with the working face of the sector plate, a pair of flexible bands secured to the sector plate and to the guide cone, and a traveling clutch maintaining the sector plate in contact with the guide cone.

6. A bevel gear milling machine comprising a base, a stationary standard supported thereon having a head, the center of which constitutes a fixed center for the co-acting parts, an oscillatory plate mounted upon the base and movable in a curvilinear plane concentric with the fixed center, a work-supporting standard carried by the oscillatory plate, means for adjusting the oscillatory plate, means for adjusting the work supporting standard relatively to the stationary standard, an arm supported by the stationary standard, a tool supporting means adjustably connected with the arm and arranged so that the longitudinal axis of the work-cutting tool will constantly intersect the fixed center, and means for automatically positioning the arm to guide the tool with respect to the work, comprising a sector plate on the free end of the arm, a guide cone engaging the working face of the sector plate, a traveling clutch engaging the sector plate and the guide cone, and means for actuating the traveling clutch.

7. A bevel gear milling machine comprising a base, a stationary standard supported thereon having a head, the center of which constitutes a fixed center for the co-acting parts, an oscillatory plate mounted upon the base and movable in a curvilinear plane concentric with the fixed center, a work-supporting standard carried by the oscillatory plate, means for adjusting the work-supporting standard relatively to the stationary standard, an arm supported by the stationary standard, a tool supporting means adjustably connected with the arm and arranged so that the longitudinal axis of the work cutting tool will constantly intersect the fixed center, and means for automatically positioning the arm to guide the tool with respect to the work, comprising a sector plate on the free end of the arm, a guide cone engaging the working face of the sector plate, a traveling clutch engaging the sector plate and the guide cone, and means for actuating the traveling clutch, comprising a pair of clutch arms, a spur wheel to oscillate the clutch arms in a fixed path, a pinion meshing with the spur wheel, a stub shaft for the pinion, a worm wheel mounted on the stub shaft and arranged to revolve unitedly with it in one direction and to permit the stub shaft to revolve independently of it in the opposite direction, a worm meshing with the worm wheel, and means for causing the revolution of the worm.

8. A bevel gear milling machine comprising a base, a stationary standard supported thereon having a head, the center of which constitutes a fixed center for the co-acting parts, an oscillatory plate mounted upon the base and movable in a curvilinear plane concentric with the fixed center, a work supporting standard carried by the oscillatory plate, means for adjusting the work-supporting standard relatively to the stationary standard, an arm supported by the stationary standard, a tool supporting means adjustably connected with the arm and arranged so that the longitudinal axis of the work-cutting tool will constantly intersect the fixed center, means for automatically positioning the arm to guide the tool with respect to the work, comprising a sector plate on the free end of the arm, a guide cone engaging the working face of the sector plate, a traveling clutch engaging the sector plate and the guide cone, and means for actuating the traveling clutch, comprising a pair of clutch arms, a spur wheel to oscillate the clutch arms in a fixed path, a pinion meshing with the spur wheel, a stub shaft for the pinion, a worm wheel mounted on the stub shaft and arranged to revolve unitedly with it in one direction and to permit the stub shaft to revolve independently of it in the opposite direction, a worm meshing with the worm wheel, means for causing the revolution of the worm, and means for automatically stopping the motion of the worm when the traveling clutch has completed its movement in a forward direction.

9. A bevel gear milling machine comprising a base, a stationary standard supported thereon having a head, the center of which constitutes a fixed center for the co-acting parts, an oscillatory plate mounted upon the base and movable in a curvilinear plane concentric with the fixed center, a work supporting standard carried by the oscillatory plate, means for adjusting the work supporting standard relatively to the stationary standard, an arm supported by the stationary standard, a tool supporting means adjustably connected with the arm and arranged so that the longitudinal axis of the work cutting tool will constantly intersect the fixed center, means for automatically positioning the arm to guide the tool with respect to the work, comprising a sector plate on the free end of the arm, a guide cone engaging the working face of the sector plate, a traveling clutch engaging the sector plate and the guide cone, and means for actuating the traveling clutch, comprising a pair of clutch arms, a spur wheel actuating the clutch arms and adapted to oscillate the clutch arms in a fixed path, a pinion meshing with the spur wheel, a stub shaft for the pinion, a worm wheel mounted on the stub shaft and arranged to revolve unitedly with it in one direction and to permit the stub shaft to revolve independently of it in the opposite direction, a worm meshing with the worm wheel, means for causing the revolution of the worm, and two bands, the ends of one of which are connected to the upper extremity of the guide cone and to the lower extremity of the sector plate, and the other to the upper extremity of the sector plate and to the lower extremity of the guide cone.

10. A bevel gear milling machine comprising a tool supporting arm, means for articulatingly holding one end of the tool supporting arm, a sector plate connected with the other end of the tool supporting arm and having its working face grooved a guide cone having its working face grooved and engaging with the working face of the sector plate, a pair of flexible bands, one flexible band being secured to the upper extremity of the guide cone and the lower extremity of the sector plate, and the other flexible band being secured to the lower extremity of the guide cone and the upper extremity of the sector plate, and a traveling clutch maintaining the sector plate in contact with the guide cone, a pair of arms to the end of which the clutch is attached, a spur wheel having a grooved hub arranged to receive said arms, and means for causing the revolution of the spur wheel.

11. A bevel gear milling machine comprising a stationary standard having a head whose center constitutes a fixed center for the co-acting parts, a work supporting standard adjustable relatively to the stationary standard and radially on an arc concentric with the fixed center, an arm articulatingly supported from the head of the stationary standard, a movable head adjustable on the arm relatively to the work holding standard, a plate swiveled to the movable head, a tool supporting means connected with the swivel plate, a sector plate on the free end of the articulating arm, a guide cone engaging the working face of the sector plate, a traveling clutch engaging the sector plate and guide cone, and means for actuating the traveling clutch.

12. A bevel gear milling machine comprising a stationary standard having a head whose center constitutes a fixed center for the co-acting parts, a work supporting standard adjustable relatively to the stationary standard and radially on an arc concentric with the fixed center, an arm articulatingly supported from the head of the stationary standard, a movable head adjustable on the arm relatively to the work holding standard, a plate swiveled to the movable head, a tool supporting means connected with the swivel plate, means for actuating the arm and causing the tool carried by the tool supporting means to produce a geometrically correct surface, comprising a sector plate on the free end of the articulating arm, a guide cone engaging the working face of the sector plate, a traveling clutch engaging the sector plate and guide cone, and means for actuating the traveling clutch.

13. A bevel gear milling machine comprising a stationary standard having a head whose center constitutes a fixed center for the co-acting parts, an oscillatory plate movable in a curvilinear plane concentric with the fixed center, a work supporting standard carried by the oscillatory plate and adjustable thereon relatively to the stationary standard, an arm articulatingly supported from the head of the stationary standard a movable head adjustable on the arm relatively to the work holding standard, a plate swiveled to the movable head, a tool supporting means connected with the swivel plate, means for actuating the arm and causing the tool carried by the tool supporting means to produce a geometrically correct surface, comprising a sector plate on the free end of the articulating arm, a guide cone engaging the working face of the sector plate, a traveling clutch engaging the sector plate and guide cone, and means for actuating the traveling clutch.

14. A bevel gear milling machine comprising a stationary standard having a head whose center constitutes a fixed center for the co-acting parts, a work supporting standard adjustable relatively to the stationary standard and radially on an arc concentric with the fixed center, an arm articulatingly supported from the head of the stationary standard, a movable head adjustable on the arm relatively to the work holding standard, a plate swiveled to the movable head, a tool supporting means connected with the swivel plate, a sector plate on the free end of the articulating arm, a guide cone engaging the working face of the sector plate, a traveling clutch engaging the sector plate and guide cone, means for actuating the traveling clutch, comprising a pair of clutch arms, a spur wheel to oscillate the clutch arms in a fixed path, a pinion meshing with the spur wheel, a stub shaft for the pinion, a worm wheel mounted on the stub shaft and arranged to revolve unitedly with it in one direction and to permit the stub shaft to revolve independently of it in the opposite direction, a worm meshing with the worm wheel, and means for causing the revolution of the worm.

15. A bevel gear milling machine comprising a stationary standard having a head whose center constitutes a fixed center for the co-acting parts, a work supporting standard adjustable relatively to the stationary standard and radially on an arc concentric with the fixed center, an arm articulatingly supported from the head of the stationary standard, a movable head adjustable on the arm relatively to the work holding standard, a plate swiveled to the movable head, a tool supporting means connected with the swivel plate, means for actuating the arm and causing the tool carried by the tool supporting means to produce a geometrically correct surface, comprising a sector plate on the free end of the articulating arm, a guide cone engaging the working face of the sector plate, a traveling clutch engaging the sector plate and guide cone, means for actuating the traveling clutch, comprising a pair of clutch arms, a spur wheel to oscillate the clutch arms in a fixed path, a pinion meshing with the spur wheel, a stub shaft for the pinion, a worm wheel mounted on the stub shaft and arranged to revolve unitedly with it in one direction and to permit the stub shaft to revolve independently of it in the opposite direction, a worm meshing with the worm wheel, and means for causing the revolution of the worm.

16. A bevel gear milling machine, comprising a stationary standard having a head whose center constitutes a fixed center for the co-acting parts, an oscillatory plate movable in a curvilinear plane concentric with the fixed center, a work supporting standard carried by the oscillatory plate and adjustable thereon relatively to the stationary standard, an arm articulatingly supported from the head of the stationary standard, a movable head adjustable on the arm relatively to the work holding standard, a plate swiveled to the movable head, a tool supporting means connected with the swivel plate, means for actuating the arm and causing the tool carried by the tool supporting means to produce a geometrically correct surface, comprising a sector plate on the free end of the articulating arm, a guide cone engaging the working face of the sector plate, a traveling clutch engaging the sector plate and guide cone, means for actuating the traveling clutch, comprising a pair of clutch arms, a spur wheel to oscillate the clutch arms in a fixed path, a pinion meshing with the spur wheel, a stub shaft for the pinion, a worm wheel mounted on the stub shaft and arranged to revolve unitedly with it in one direction and to permit the stub shaft to revolve independently of it in the opposite direction, a worm meshing with the worm wheel, and means for causing the revolution of the worm.

17. A bevel gear milling machine comprising a stationary standard having a head whose center constitutes a fixed center for the co-acting parts, a work supporting standard adjustable relatively to the stationary standard and radially on an arc concentric with the fixed center, an arm articulatingly supported from the head of the stationary standard, a movable head adjustable on the arm relatively to the work holding standard, a plate swiveled to the movable head, a tool supporting means connected with the swivel plate, a sector plate on the free end of the articulating arm, a guide cone engaging the working face of the sector plate, a traveling clutch engaging the sector plate and guide cone, means for actuating the traveling clutch, comprising a pair of clutch arms, a spur wheel to oscillate the clutch arms in a fixed path, a pinion meshing with the spur wheel, a stub shaft for the pinion, a worm wheel mounted on the stub shaft and arranged to revolve unitedly with it in one direction and to permit the stub shaft to revolve independently of it in the opposite direction, a worm meshing with the worm wheel, means for causing the revolution of the worm, and means for stopping the motion of the worm when the traveling clutch has completed its movement in the forward direction.

18. A bevel gear milling machine comprising a stationary standard having a head whose center constitutes a fixed center for the co-acting parts, a work supporting standard adjustable relatively to the stationary standard and radially on an arc concentric with the fixed center, an arm articulatingly supported from the head of the stationary standard, a movable head adjustable on the arm relatively to the work holding standard, a plate swiveled to the movable head, a tool supporting means connected with the swivel plate, means for actuating the arm and causing the tool carried by the tool supporting means to produce a geometrically correct surface, comprising a sector plate on the free end of the articulating arm, a guide cone engaging the working face of the sector plate, a traveling clutch engaging the sector plate and guide cone, means for actuating the traveling clutch, comprising a pair of clutch arms, a spur wheel to oscillate the clutch arms in a fixed path, a pinion meshing with the spur wheel a stub shaft for the pinion, a worm mounted on the stub shaft and arranged to revolve unitedly with it in one direction and to permit the stub shaft to revolve independently of it in the opposite direction, a worm meshing with the worm wheel, means for causing the revolution of the worm, and means for stopping the motion of the worm when the traveling clutch has completed its movement in the forward direction.

19. A bevel gear milling machine comprising a stationary standard having a head whose center constitutes a fixed center for the co-acting parts, an oscillatory plate movable in a curvilinear plane concentric with the fixed center, a work supporting standard carried by the oscillatory plate and adjustable thereon relatively to the stationary standard, an arm articulatingly supported from the head of the stationary standard a movable head adjustable on the arm relatively to the work holding standard, a plate swiveled to the movable head, a tool supporting means connected with the swivel plate, means for actuating the arm and causing the tool carried by the tool supporting means to produce a geometrically correct surface, comprising a sector plate on the free end of the articulating arm, a guide cone engaging the working face of the sector plate, a traveling clutch engaging the sector plate and guide cone, means for actuating the traveling clutch, comprising a pair of clutch arms, a spur wheel to oscillate the clutch arms in a fixed path, a pinion meshing with the spur wheel, a stub shaft for the pinion, a worm wheel mounted on the stub shaft and arranged to revolve unitedly with it in one direction and to permit the stub shaft to revolve independently of it in the opposite direction, a worm meshing with the worm wheel, means for causing the revolution of the worm, and means for stopping the motion of the worm when the traveling clutch has completed its movement in the forward direction.

20. A bevel gear milling machine comprising a stationary standard having a head whose center constitutes a fixed center for the co-acting parts, a work supporting standard adjustable relatively to the stationary standard and radially on an arc concentric with the fixed center, an arm articulatingly supported from the head of the stationary standard, a movable head adjustable on the arm relatively to the work holding standard, a plate swiveled to the movable head, a tool supporting means connected with the swivel plate, a sector plate on the free end of the articulating arm, a guide cone engaging the working face of the sector plate, a traveling clutch engaging the sector plate and guide cone, means for actuating the traveling clutch, comprising a pair of clutch arms, a spur wheel to oscillate the clutch arms in a fixed path, a pinion meshing with the spur wheel, a stub shaft for the pinion, a worm wheel mounted on the stub shaft and arranged to revolve unitedly with it in one direction and to permit the stub shaft to revolve independently of it in the opposite direction, a worm meshing with the worm wheel, means for causing the revolution of the worm, means for stopping the motion of the worm when the traveling clutch has completed its movement in the forward direction, and two bands the ends of one of which are connected to the upper extremity of the guide cone and the lower extremity of the sector plate, and the other to the upper extremity of the sector plate, and to the lower extremity of the guide cone.

21. A bevel gear milling machine comprising a stationary standard having a head whose center constitutes a fixed center for the co-acting parts, an oscillatory plate mounted on the base and movable in a curvilinear plane concentric with the fixed center, a work supporting standard carried by the oscillatory plate and adjustable thereon relatively to the stationary standard, an arm articulatingly supported from the head of the stationary standard a movable head adjustable on the arm relatively to the work holding standard, a plate swiveled to the movable head, a tool supporting means connected with the swivel plate, means for actuating the arm and causing the tool carried by the tool supporting means to produce a geometrically correct surface, comprising a sector plate on the free end of the articulating arm, a guide cone engaging the working face of the sector plate, a traveling clutch engaging the sector plate and guide cone, means for actuating the traveling clutch, comprising a pair of clutch arms, a spur wheel to oscillate the clutch arms in a fixed path, a pinion meshing with the spur wheel, a stub shaft for the pinion, a worm wheel mounted on the stub shaft and arranged to revolve unitedly with it in one direction and to permit the stub shaft to revolve independently of it in the opposite direction, a worm meshing with the worm wheel, means for causing the revolution of the worm, means for stopping the motion of the worm when the traveling clutch has completed its movement in the forward direction, and two bands the ends of one of which are connected to the upper extremity of the guide cone and the lower extremity of the sector plate, and the other to the upper extremity of the sector plate, and to the lower extremity of the guide cone.

In testimony, that I claim the foregoing as my invention, I have signed my name in presence of two subscribing witnesses.

PERCY LEONARD WESTON.

Witnesses:
T. C. ALLEN,
WALTER SIGMONT.